(12) United States Patent
Sakai et al.

(10) Patent No.: US 7,611,057 B2
(45) Date of Patent: Nov. 3, 2009

(54) CONTENTS ACCESS METHOD AND SORTING APPARATUS

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 11/360,389

(22) Filed: Feb. 24, 2006

(65) Prior Publication Data

US 2007/0023524 A1 Feb. 1, 2007

(30) Foreign Application Priority Data

Jul. 29, 2005 (JP) .............................. 2005-221656

(51) Int. Cl.
*G06K 7/10* (2006.01)
(52) U.S. Cl. .................. 235/454; 235/462.15
(58) Field of Classification Search ................ 235/375, 235/385, 462.01, 462.15, 462.45, 462.48, 235/462.49, 454, 472.01, 476
See application file for complete search history.

(56) References Cited

U.S. PATENT DOCUMENTS

| | | | | |
|---|---|---|---|---|
| 5,913,210 A * | 6/1999 | Call | .............................. | 707/4 |
| 5,950,173 A | 9/1999 | Perkowski | | |
| 5,992,752 A * | 11/1999 | Wilz et al. | ............. | 235/472.01 |
| 6,868,433 B1 * | 3/2005 | Philyaw | ...................... | 709/203 |
| 2003/0001017 A1 * | 1/2003 | Konda | ................... | 235/462.15 |
| 2003/0163833 A1 | 8/2003 | Chiba et al. | | |
| 2004/0014460 A1 | 1/2004 | Moroo et al. | | |
| 2004/0234139 A1 | 11/2004 | Moroo et al. | | |
| 2005/0203835 A1 | 9/2005 | Nhaissi et al. | | |

FOREIGN PATENT DOCUMENTS

| | | |
|---|---|---|
| EP | 1 172 752 | 1/2002 |
| JP | 10171758 | 6/1998 |
| JP | 10-240661 | 9/1998 |
| JP | 2002-502073 | 1/2002 |
| JP | 2002-207696 | 7/2002 |
| JP | 2003-250025 | 9/2003 |
| JP | 2004-056356 | 2/2004 |
| JP | 2004-349879 | 12/2004 |
| WO | 00/49838 | 8/2000 |

OTHER PUBLICATIONS

European Search Report in corresponding Application No. 06110534.2-2201 dated Apr. 18, 2006.
International Business Machines Corporation: "Product Code Reference to Web Sites"; Research Disclosure, Mason Publications, Hampshire, GB, vol. 409, No. 122, May 1998.
"Japanese Office Action", mailed Dec. 2, 2008, JP Application No. 2005-221656 (English translation).

* cited by examiner

*Primary Examiner*—Seung H Lee
(74) *Attorney, Agent, or Firm*—Fujitsu Patent Center (57) ABSTRACT

A method of providing an access to contents on a network includes sorting a first code for accessing the contents received from a contents requesting source to a pre-registered sorting destination based on a predetermined rule, and converting the first code, or a second code that is generated based on the first code, into information indicating a storage place of the contents.

14 Claims, 10 Drawing Sheets

| CONVERSION SERVER ID | ADDRESS OF CONVERSION SERVER |
|---|---|
| 00000001 | www.convert-A.co.jp |
| 00000010 | www.convert-B.co.jp |
| 00000011 | www.convert-C.co.jp |
| 00000100 | www.convert-D.co.jp |
| ... | ... |

| CONTENTS ID | URL OF CONTENTS |
|---|---|
| 0000000000000001 | http://www.contents-A.co.jp/index01.html |
| 0000000000000010 | http://www.contents-A.co.jp/index02.html |
| 0000000000000011 | http://www.contents-A.co.jp/index03.html |
| 0000000000000100 | http://www.contents-A.co.jp/index04.html |
| ... | ... |

CONTENTS ACCESS METHOD AND SORTING APPARATUS

BACKGROUND OF THE INVENTION

1. Field of the Invention

The present invention relates to a technology for providing an access to contents on a network using a code.

2. Description of the Related Art

There are a variety of contents on the Internet. To access the contents, it is generally necessary to specify a character string that conforms to a specific format called a uniform resource locator (URL) to a terminal.

The URL is formed with about 10 to 30 characters, and in some cases, it is not easy to specify the URL accurately. In order to ease the difficulty, services are provided to enable access to contents on the Internet by specifying a short code. The specified code is transmitted to a conversion server, and then the conversion server converts the code to an official URL.

The mechanism is further applied to realize a service in conjunction with a technology to embed a code in image data. Such a service is disclosed in Japanese Patent Application Laid-open No. 2004-349879. With the method of embedding a code in image data for accessing contents related to the image data, a user can easily select and access desired contents, relying on the image.

However, when a plurality of providers offers the service to access contents using a code, the user may be confused. For example, if each of a plurality of the providers offers a proprietary mechanism to allow access to contents with the code obtained from an image data, the user will have to be aware of which images correspond to which provider's service, or else the user will be unable to access the contents.

SUMMARY OF THE INVENTION

It is an object of the present invention to solve at least the above problems in the conventional technology.

A method of providing an access to contents on a network, according to one aspect of the present invention, includes sorting a first code for accessing the contents received from a contents requesting source to a pre-registered sorting destination based on a predetermined rule; and converting the first code, or a second code that is generated based on the first code, into information indicating a storage place of the contents.

A sorting apparatus connected to a contents providing system that provides contents corresponding to a code via a network, according to another aspect of the present invention, includes a receiving unit that receives a first code for accessing the contents from a contents requesting source; and a sorting unit that sorts the first code to a pre-registered contents providing system based on a predetermined rule.

A computer-readable recording medium according to still another aspect of the present invention stores a sorting program that is executed on a computer connected to a contents providing system that provides contents corresponding to a code via a network. The sorting program causes the computer to execute receiving a first code for accessing the contents from a contents requesting source; and sorting the first code to a pre-registered contents providing system based on a predetermined rule.

A computer-readable recording medium according to still another aspect of the present invention stores a computer program for obtaining contents from at least one contents providing system that provides contents on a network. The computer program causes a computer to execute reading a code corresponding to the contents from an image data in which the code is embedded; and sorting a contents obtaining request to a contents providing system corresponding to the code by transmitting the code to a known sorting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 13:
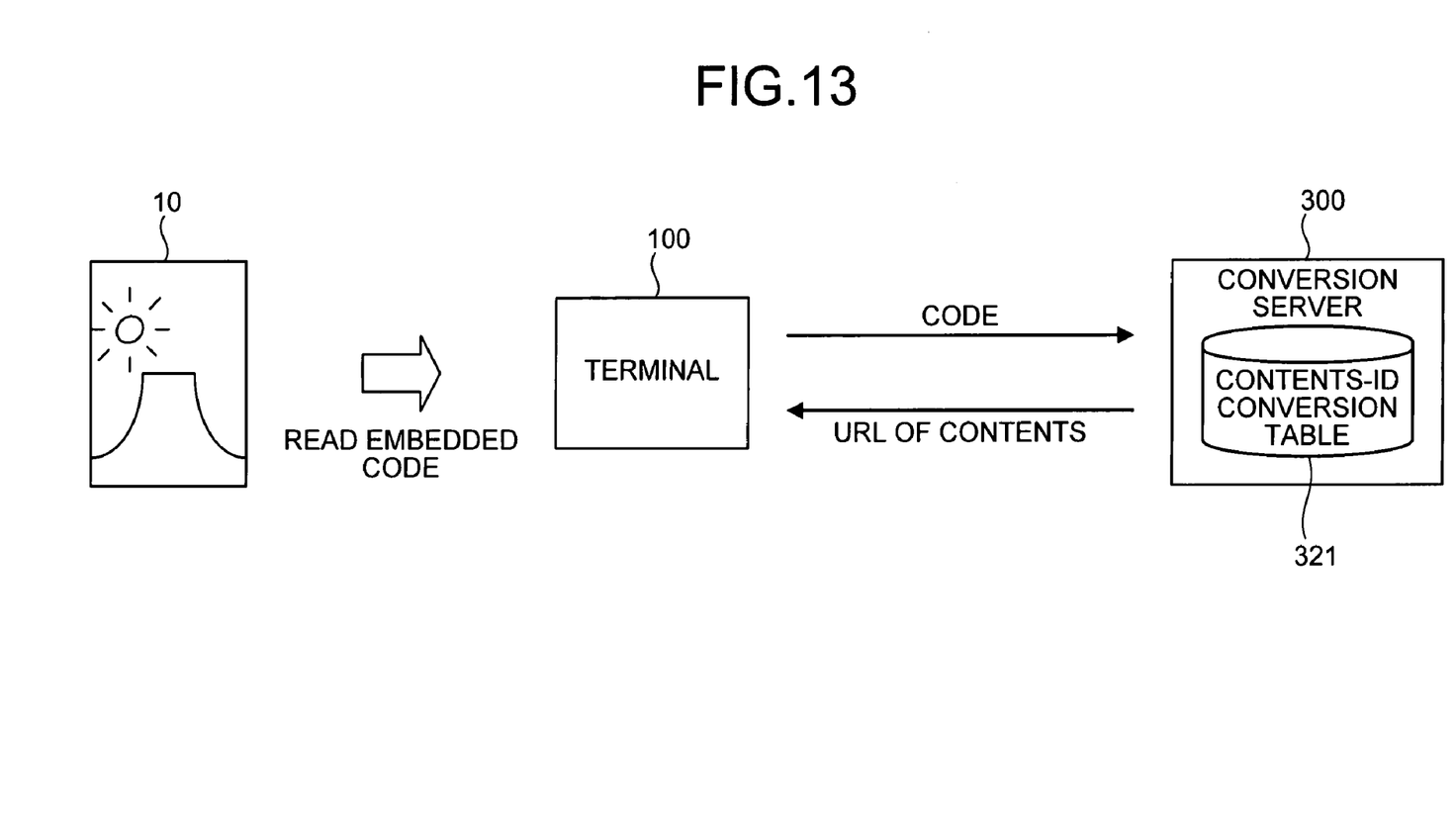
FIG. 13 is a schematic for illustrating a contents access method according to a conventional technology.

FIG. 13 is a schematic for illustrating a contents access method according to a conventional technology, showing an example to access contents using a code embedded in image data. A technology described in Japanese Patent Application Laid-open No. 2004-349879 can be used for embedding the code in the image data.

An image data 10 has a code embedded therein to access contents. The image data 10, when printed or displayed, can be visualized. The visualized image looks like regular image data to naked eyes, but is unable to tell that the code is embedded.

A terminal 100 is an information processor capable of displaying contents on the Internet, and the terminal obtains the code embedded in the image data 10, transmits the code to a conversion server 300, and obtains the contents.

The terminal 100 may be a cellular phone terminal equipped with a photo-taking function, obtaining the image data 10 by taking a picture with the photo-taking function and obtaining the code by reading the image data 10 with a program distributed by the contents provider of the conversion server 300. The program then transmits the code to the conversion server 300 to obtain the contents.

The conversion server 300 converts the code transmitted from the terminal 100 to a URL of the contents on the Internet. The conversion server 300 has a contents-ID conversion table 321 to which correspondences of the codes and the URLs of the contents are pre-registered, and converts the code using the contents-ID conversion table 321.

The conversion server 300 is shown to be configured to obtain the code from the terminal 100 and to return the URL of the contents to the terminal 100, but the conversion server 300 can be configured so that the conversion server 300 accesses the contents using the URL of the contents and return the contents to the terminal 100.

The method of embedding the code for accessing contents in the image data can realize a user-friendly mechanism for the user: if appropriate image data is chosen in which to embed the code, the user can easily associate the image data with the contents. It is also easier to avoid inaccessibility due to an error in recognizing the code, because the short code and not the URL of the contents itself is embedded in the image data.

However, problems will arise if a plurality of contents providers provides a proprietary system using the mechanism. If each of the contents providers provides a proprietary program to obtain the code and access the contents, the user will have to select the appropriate program and transmit the code to the appropriate conversion server when accessing the contents using the image data; otherwise the user will be unable to obtain the contents.

Figure 1:
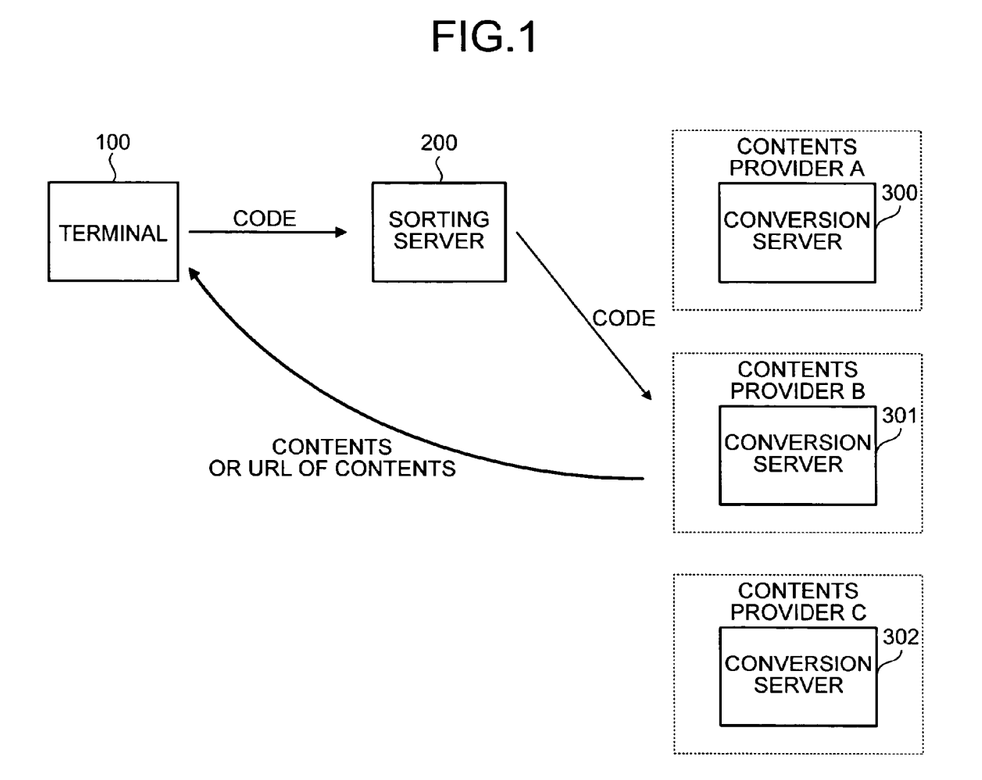
FIG. 1 is a schematic for illustrating a principle of the present invention.

FIG. 1 is a schematic for illustrating a principle of the present invention. As shown in the figure, a sorting server 200 is provided, and the system is configured so that the sorting server 200 receives all the codes for accessing the contents, and sorts the codes to a conversion server of a corresponding contents provider.

With the above configuration, the user can use the service without being conscious of the individual contents providers, even with the presence of a plurality of contents providers. The contents provider can also lighten the process load on his/her conversion server as well as reduce man-hours to maintain the server, by leaving procedures that are common with other contents providers such as access controlling and charging to the sorting server 200.

The basic functions of the sorting server 200 may only sort the code to the corresponding contents provider as shown in FIG. 1, or they may include the process of returning to the terminal 100 the URL of the contents returned from the contents provider or the contents themselves. They may further include the process of obtaining the contents from the URL of contents returned by the contents provider and returning the obtained contents to the terminal 100.

If the sorting server 200 is configured to return the URL of the contents or the contents themselves to the terminal 100, the details of the server of the contents provider can be hidden from the user, and the configuration can prevent illegal access to the server.

Figure 2:
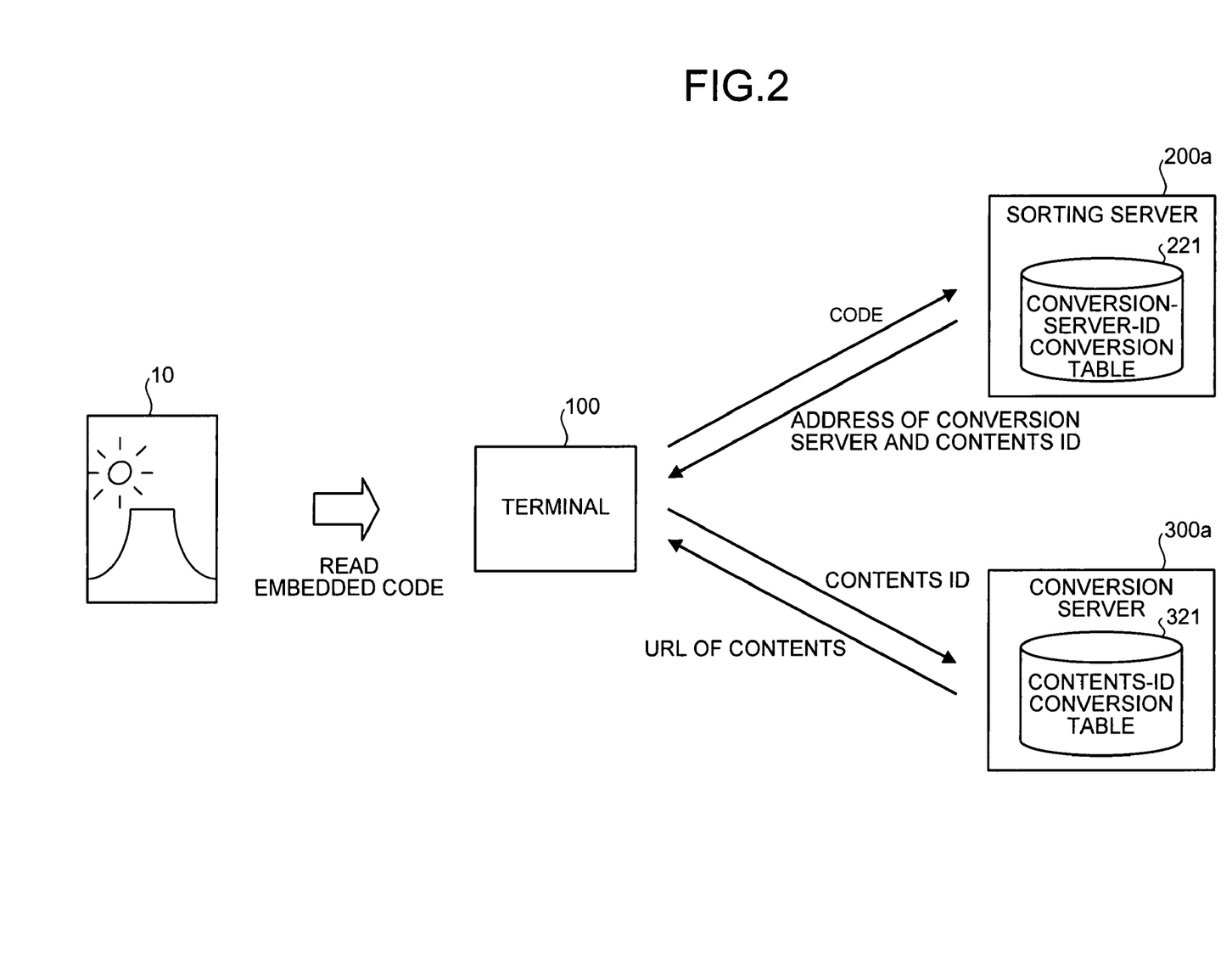
FIG. 2 is a schematic for illustrating a contents access method according to a first embodiment of the present invention.

FIG. 2 is a schematic for illustrating a contents access method according to a first embodiment of the present invention. The contents access method according to the first embodiment is implemented with the image data 10, the terminal 100, a sorting server 200*a* and a conversion server 300*a*.

The image data 10 has a code embedded therein to access contents. The image data 10 may be loaded to the terminal 100 via a network, via a storage medium, such as a DVD-ROM, or by picture taking of a picture-taking function of the terminal 100.

The terminal 100 is an information processor capable of displaying contents on the Internet, and may be for example a PC or a cellular phone terminal equipped with a photo-taking function. The terminal 100 is also capable of running a program to obtain the contents.

The program to obtain the contents read the code embedded in the image data 10, transmits the code to the sorting server 200*a* known to the terminal 100, and receives an address of a conversion server and a contents ID in response. The program then transmits the contents ID to the returned address of the conversion server and receives a URL of the contents in response. The program then passes the URL over to a web browser, which then obtains the contents.

The program to obtain the contents is stored on a storing unit of the terminal 100 or on one of the servers such as the sorting server 200*a*, and is read and loaded on memory of the terminal 100 as necessary and then executed by a processor.

The sorting server 200*a* is connected to the terminal 100 via a network and is responsible for selecting the conversion server that stores correspondences of the codes and the contents.

Upon receiving the code for accessing the contents from the terminal 100, the sorting server 200*a*, decodes the code and obtains a conversion server ID and a contents ID. The conversion server ID is used by the sorting server 200*a* to identify a conversion server while the contents ID is used by the conversion server to identify the contents.

The sorting server 200*a* then searches a conversion-server-ID conversion table 221, to which correspondences of conversion server IDs and addresses of the conversion servers are stored in advance, obtains the address of the conversion server that corresponds to the conversion server ID, and returns the obtained address of the conversion server and the contents ID to the terminal 100.

However, if no entry is found in the conversion-server-ID conversion table 221 that corresponds to the conversion server ID, the sorting server 200*a* does not respond to the terminal 100. The attempt of the terminal 100 to obtain the contents thus fails with an error.

The configuration that the conversion server is selectable only from among the pre-registered conversion servers enables rejection of attempts to lead to illegal contents. A provider of illegal contents may include a code in the image data that leads to its own contents, and disguises that the image data is provided by a rightful contents provider. However, such an illegal manipulation does not work with the above configuration, because the conversion-server-ID conversion table 221 does not have an entry for the conversion server of the illegal contents provider and the attempt of the illegal contents provider to lead to its own contents is rejected.

The conversion server 300*a* is connected to the terminal 100 via the network and is responsible for converting the contents ID to the URL of the contents.

Upon receiving the contents ID from the terminal 100, the conversion server 300*a*, searches the contents-ID conversion table 321, to which the correspondences of the contents ID and URLs of the contents are stored in advance, obtains a URL that corresponds to the contents ID, and returns the obtained URL of the contents to the terminal 100.

In FIG. 2, only one conversion server is indicated, but there is no restriction on the number of the conversion servers. In principle, each of the contents providers provides at least one conversion server. Regardless of the number of conversion servers, the terminal 100 does not need to be aware of them, because the address of the conversion server necessary for accessing the contents is returned from the sorting server 200a.

The contents access method according to the first embodiment is configured so that the sorting server 200a selects the conversion server using the code for accessing the contents, and that the terminal 100 accesses the selected-conversion server to obtain the contents. In this configuration, the sorting server 200a is not involved in processes once the conversion server is selected, and therefore the load on the sorting server 200a is light.

The contents access method can also be configured so that the sorting server 200a, in returning the address of the conversion server and the contents ID to the terminal 100, attaches authentication information to the contents ID, and that the conversion server 300a confirms the authentication information attached to the contents ID transmitted from the terminal 100. In this configuration, the conversion server 300a can reject illegal accesses not coming through the sorting server 200a.

The terminal 100 can also be configured so as to decode the code into the conversion server ID and the contents ID and transmits only the conversion server ID to the sorting server 200a. In this configuration, the load on the sorting server 200a is further lightened. On the other hand, if the sorting server 200a is responsible for decoding the code, the decoding process is centralized at one place, and it is therefore easier to make changes in the format of the code, etc.

The code can also be configured so as to be made up of only the contents ID and not a combination of the conversion server ID and the contents ID. In this configuration, the sorting server 200a selects the conversion server based on the range of the value or the format of the contents ID.

Figure 3:
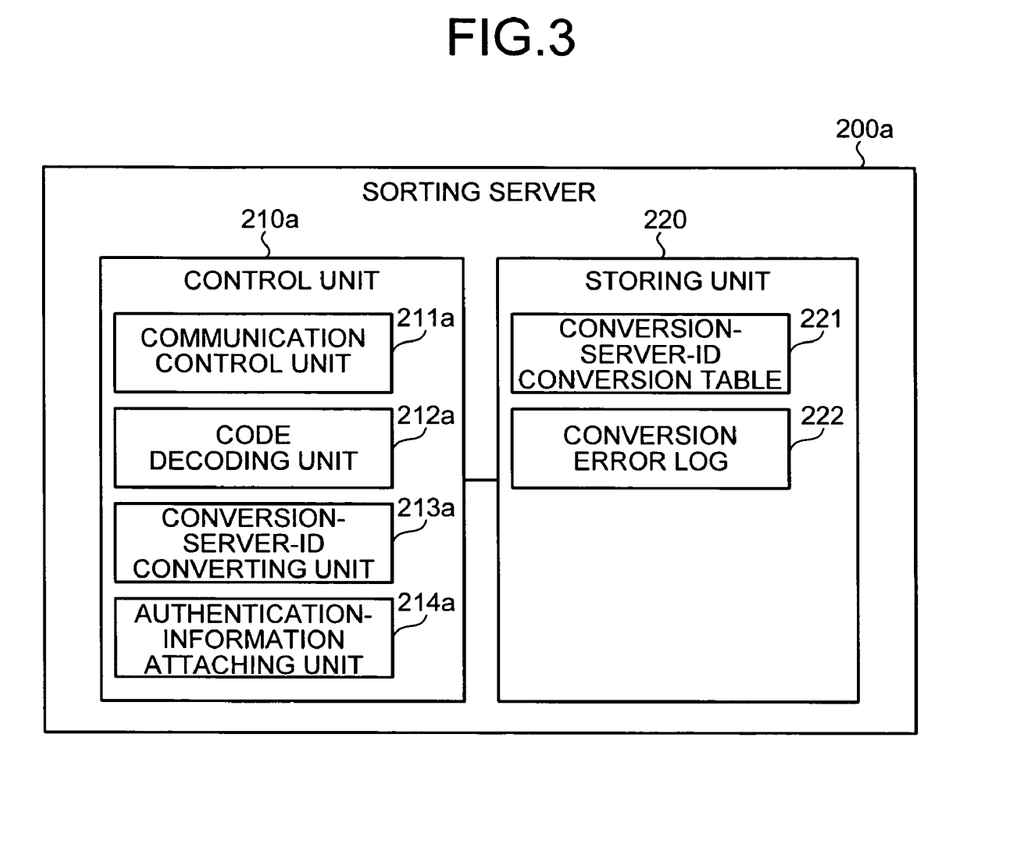
FIG. 3 is a block diagram of a sorting server according to the first embodiment.

FIG. 3 is a block diagram of the sorting server 200a according to the first embodiment. The sorting server 200a has a control unit 210a and a storing unit 220.

The control unit 210a controls the entire sorting server 200a, and has a communication control unit 211a, a code decoding unit 212a, a conversion-server-ID converting unit 213a, and an authentication-information attaching unit 214a.

The communication control unit 211a controls transmission and receipt of various pieces of information through the network. Specifically the communication control unit 211a controls such processes as receiving the code for accessing contents transmitted from the terminal 100, etc. and transmitting the address of the conversion server and the contents ID to the terminal that has transmitted the code.

The code decoding unit 212a controls the process to obtain the conversion server ID and the contents ID from the code received by the communication control unit 211a. For example, if the code is 24 bits wide and first 8 bits represent the conversion server ID and last 16 bits represent the contents ID, the code decoding unit 212a separates the code into the first 8 bits and the last 16 bits.

The conversion-server-ID converting unit 213a searches the conversion-server-ID conversion table 221 stored in the storing unit 220 for the address of the conversion server that corresponds to the conversion server ID obtained by the code decoding unit 212a. If the address of the conversion server that corresponds to the conversion server ID is not found on the conversion-server-ID conversion table 221, the communication control unit 211a does not transmit the address of the conversion server and the contents ID to the terminal that has transmitted the code.

The authentication-information attaching unit 214a attaches authentication information to the contents ID that the code decoding unit 212a has obtained. The authentication information is used by the conversion server to confirm that the contents ID is sent through the sorting server 200a and therefore is not unrighteous.

For example, the IP address of the terminal that has transmitted the code may be hashed with a hash function and the resultant value may be attached to the contents ID as the authentication information. In this case, the conversion server can confirm if the contents ID is transmitted via the sorting server 200a by hashing the IP address of the terminal that has transmitted the contents ID with the same hash function and comparing the resultant value to the value attached to the contents ID.

Figure 4:
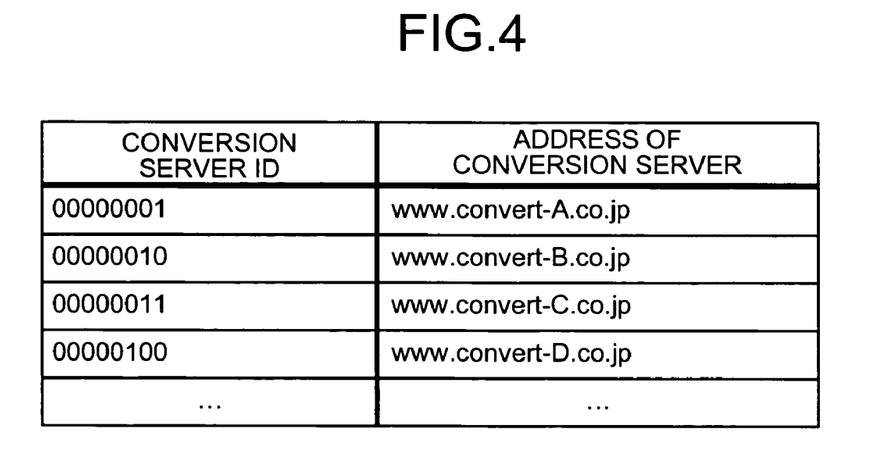
FIG. 4 is an example of a conversion-server-ID conversion table.

The storing unit 220 stores various pieces of information including the conversion-server-ID conversion table 221 and a conversion error log 222. FIG. 4 is an example a conversion-server-ID conversion table. The conversion-server-ID conversion table 221 holds correspondences of the conversion server IDs and the addresses of the conversion servers.

The conversion error log 222 is a record of incidents that the conversion-server-ID converting unit 213a is unable to obtain the address of the conversion server, and holds the value of the code, the IP address of the terminal that has transmitted the code, the date and time, etc. The information is used to identify illegal attempts to access.

Figure 5:
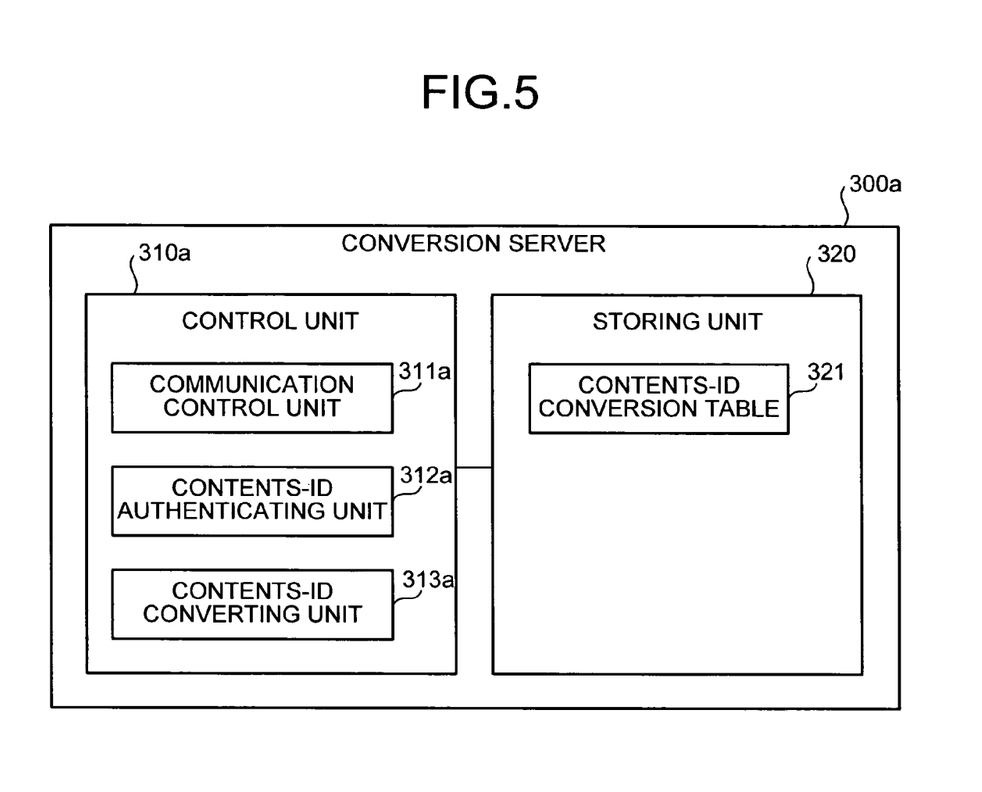
FIG. 5 is a block diagram of a conversion server according to the first embodiment.

FIG. 5 is a block diagram of the conversion server 300a according to the first embodiment. The conversion server 300a has a control unit 310a and a storing unit 320.

The control unit 310a controls the entire conversion server 300a, and has a communication control unit 311a, a contents-ID authenticating unit 312a, and a contents-ID converting unit 313a.

The communication control unit 311a controls transmission and receipt of various pieces of information through the network. Specifically the communication control unit 311a controls such processes as receiving the contents ID transmitted from the terminal 100, etc. and transmitting the URL of the contents to the terminal that has transmitted the contents ID.

The contents-ID authenticating unit 312a separates and obtains the authentication information attached to the contents ID that the communication control unit 311a has received, and confirms if the contents ID is transmitted via the sorting server 200a. If the contents ID is not transmitted via the sorting server 200a, the communication control unit 311a does not return the URL of the contents to the terminal that has transmitted the contents ID.

The contents-ID converting unit 313a searches the contents-ID conversion table 321 stored on the storing unit 320 and obtains the URL of the contents that corresponds to the contents ID from which the authentication information is removed by the contents-ID authenticating unit 312a. If the URL of the contents that corresponds to the contents ID is not found on the contents-ID conversion table 321, the communication control unit 311a does not return the URL of the contents to the terminal that has transmitted the code.

Figure 6:
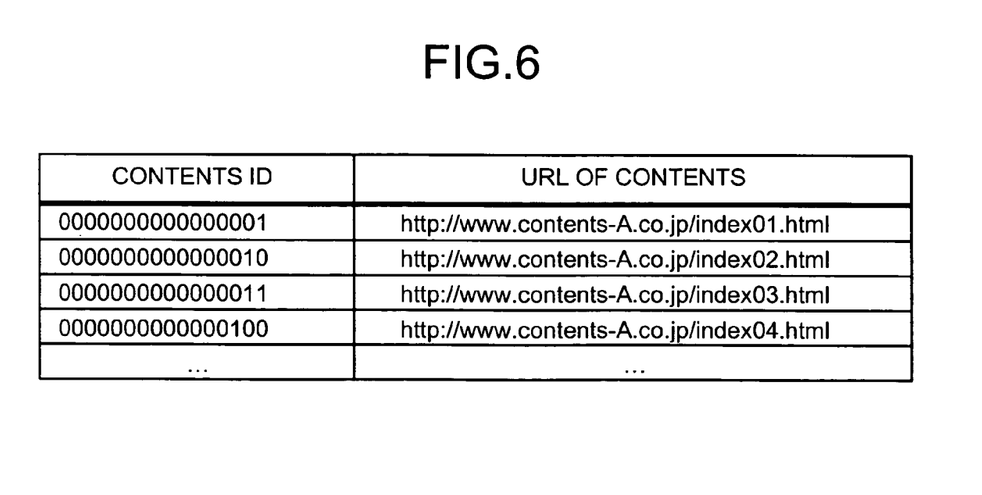
FIG. 6 is an example of a contents-ID conversion table.

The storing unit 320 stores various pieces of information including the contents-ID conversion table 321. FIG. 6 is an example of the contents-ID conversion table 321. The contents-ID conversion table 321 holds correspondences of the contents IDs and the URLs of the contents.

Figure 7:
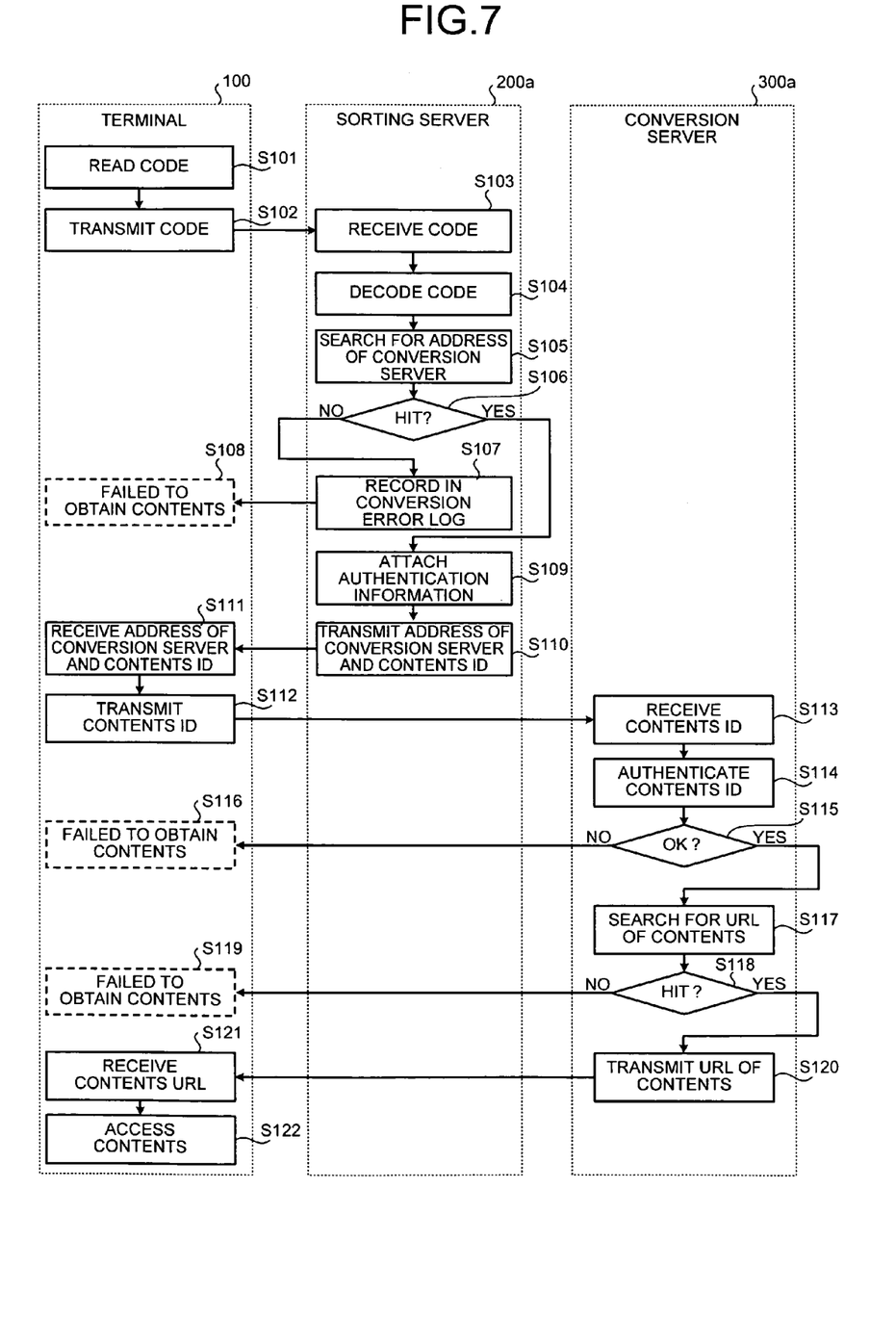
FIG. 7 is a flowchart of a processing process for a terminal, a sorting server, and a conversion server shown in FIG. 2.

FIG. 7 is a flowchart of a processing process for the terminal 100, the sorting server 200a, and the conversion server 300a shown in FIG. 2.

The terminal 100 first reads the code embedded in the image data 10 (step S101), and transmits the code to the sorting server 200a (step S102).

The sorting server 200a, upon receiving the code (step S103), decodes the code and obtains the conversion server ID and the contents ID (step S104). The sorting server then searches the conversion-server-ID conversion table 221 and obtains the address of the conversion server (step S105).

If the corresponding address of the conversion server is not found (NO at step S106), the sorting server 200a logs the failure to the conversion error log 222 (step S107). The sorting server 200a does not return the address of the conversion server and the contents ID to the terminal 100, and the attempt of the terminal 100 to access the contents fails (step S108).

If the address of the conversion server that corresponds to the conversion server ID is found (YES at step S106), the sorting server 200a attaches the authentication information to the contents ID (step S109), and returns the address of the conversion server and the contents ID to the terminal 100 (step S110).

The terminal 100, upon receiving the address of the conversion server and the contents ID (step S111), transmits the contents ID to the server (the conversion server 300a in this example) indicated by the address of the conversion server (step S112).

The conversion server 300a, upon receiving the contents ID (step S113), separates the authentication information from the contents ID and, using the authentication information, confirms if the contents ID is transmitted via the sorting server 200a (step S114).

If the conversion server 300a judges that the contents ID is not transmitted via the sorting server 200a (NO at step S115), the conversion server 300a does not return the URL of the contents to the terminal 100, and the attempt of the terminal 100 to access the contents fails (step S116).

If the conversion server 300a judges that the contents ID is transmitted via the sorting server 200a (YES at step S115), the conversion server 300a searches the contents-ID conversion table 321 and obtains the URL of the contents that corresponds to the contents ID (step S117).

If the URL of the contents that corresponds to the contents ID is not found (NO at step S118), the conversion server 300a does not return the URL of the contents to the terminal 100, and the attempt of the terminal 100 to access the contents fails (step S119).

If the URL of the contents that corresponds to the contents ID is found (YES in Step S118), the conversion server 300a returns the URL of the contents to the terminal 100 (step S120). The terminal 100, upon receiving the URL of the contents (step S121), accesses the URL to obtain the contents (step S122).

The various processes of the terminal 100, the sorting server 200a, and the conversion server 300a, explained in the first embodiment above, can be realized by executing programs provided in advance on computers. An example of such a computer that executes the program is explained below: a computer that realizes the functionality of the sorting server 200a is explained as an example.

Figure 8:
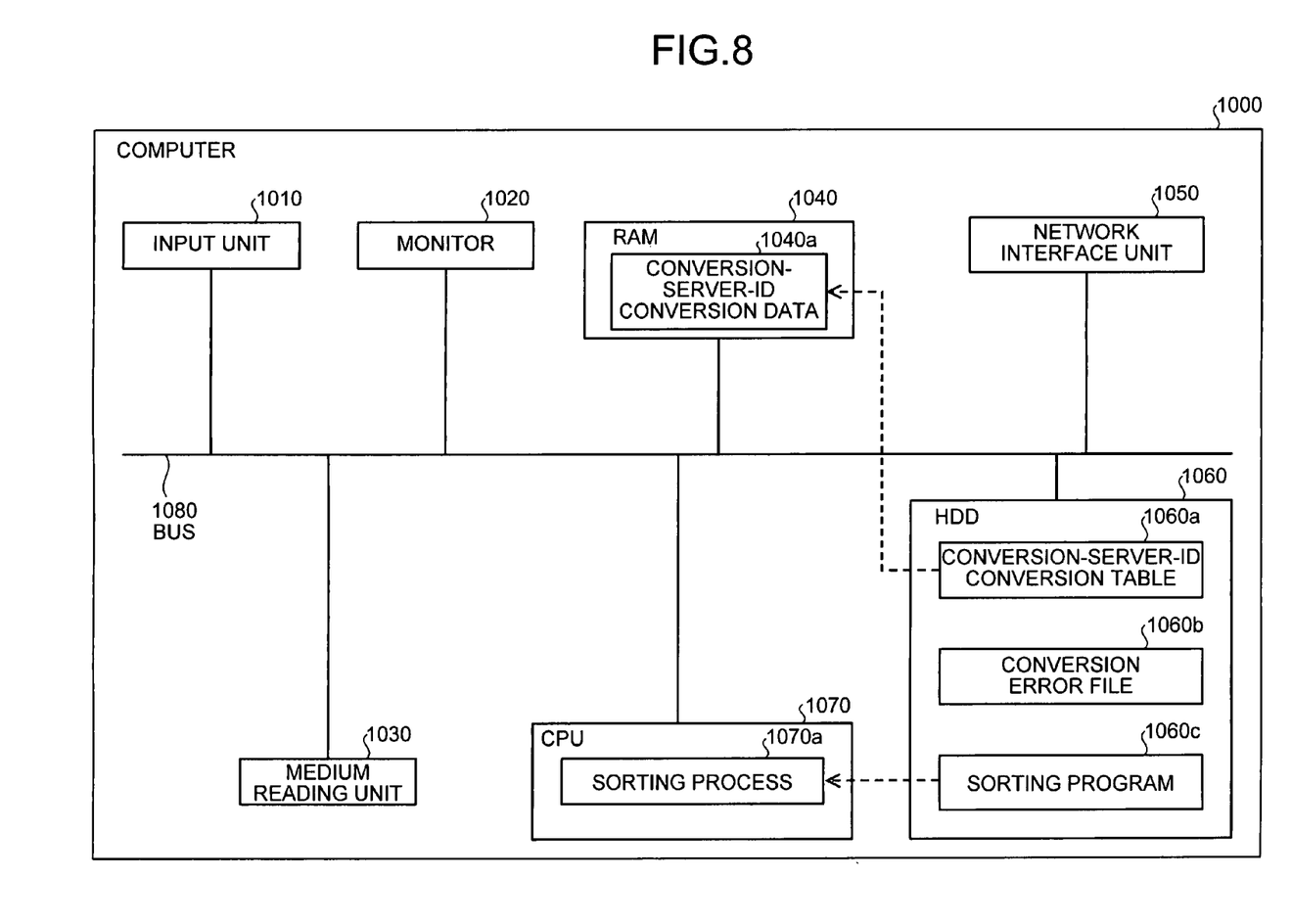
FIG. 8 is a block diagram of a computer to execute a sorting program.

FIG. 8 is a block diagram of a computer 1000 to execute a sorting program. The computer 1000 includes an input unit 1010 that receives the data from the user, a monitor 1020, a medium reading unit 1030 for reading programs from a storage medium that stores various programs, a random access memory (RAM) 1040 that stores various pieces of information temporarily, a network interface unit 1050 that transmits and receives data with other computers through the network, a hard disk drive (HDD) 1060, and a central processing unit (CPU) 1070, all connected with a bus 1080.

The HDD 1060 stores a sorting program 1060c that has the capacity to realize the functions equivalent to those of the sorting server 200a. The HDD 1060 also stores a conversion-server-ID conversion table 1060a, equivalent to the conversion-server-ID conversion table 221 in FIG. 3, and a conversion error file 1060b, equivalent to the conversion error log 222.

The CPU 1070 reads the sorting program 1060c from the HDD 1060 and executes the program, and the program functions as a sorting process 1070a. The sorting process 1070a corresponds to the control unit 210a indicated in FIG. 3.

The CPU 1070 also reads information from the conversion-server-ID conversion table 1060a on the HDD 1060 as necessary, stores the information on the RAM 1040 as a conversion-server-ID conversion data 1040a, and performs various data processings with the use of the conversion-server-ID conversion data 1040a stored on the RAM 1040.

The sorting program 1060c needs not necessarily to be stored on the HDD 1060. The computer 1000 may read and execute the sorting program 1060c stored on a storage medium like a CD-ROM. Alternatively the sorting program 1060c may be stored on another computer (or a server) connected to the computer 1000 via a public circuit, the Internet, a LAN, or a WAN, and the computer 1000 reads the program from the computer or the server and executes the program.

The configuration according to the first embodiment is such that the sorting server sorts the code to the conversion server based on a predetermined rule, and even with the presence of a plurality of conversion servers that provides an access to the contents with a code, the user can access contents without confusion by transmitting the code for accessing the contents to the conversion server.

According to the first embodiment, the sorting server returns the address of the conversion server to the terminal that has transmitted the code. However, according to a second embodiment, a configuration is explained in which the address of the conversion server is hidden from the terminal.

Figure 9:
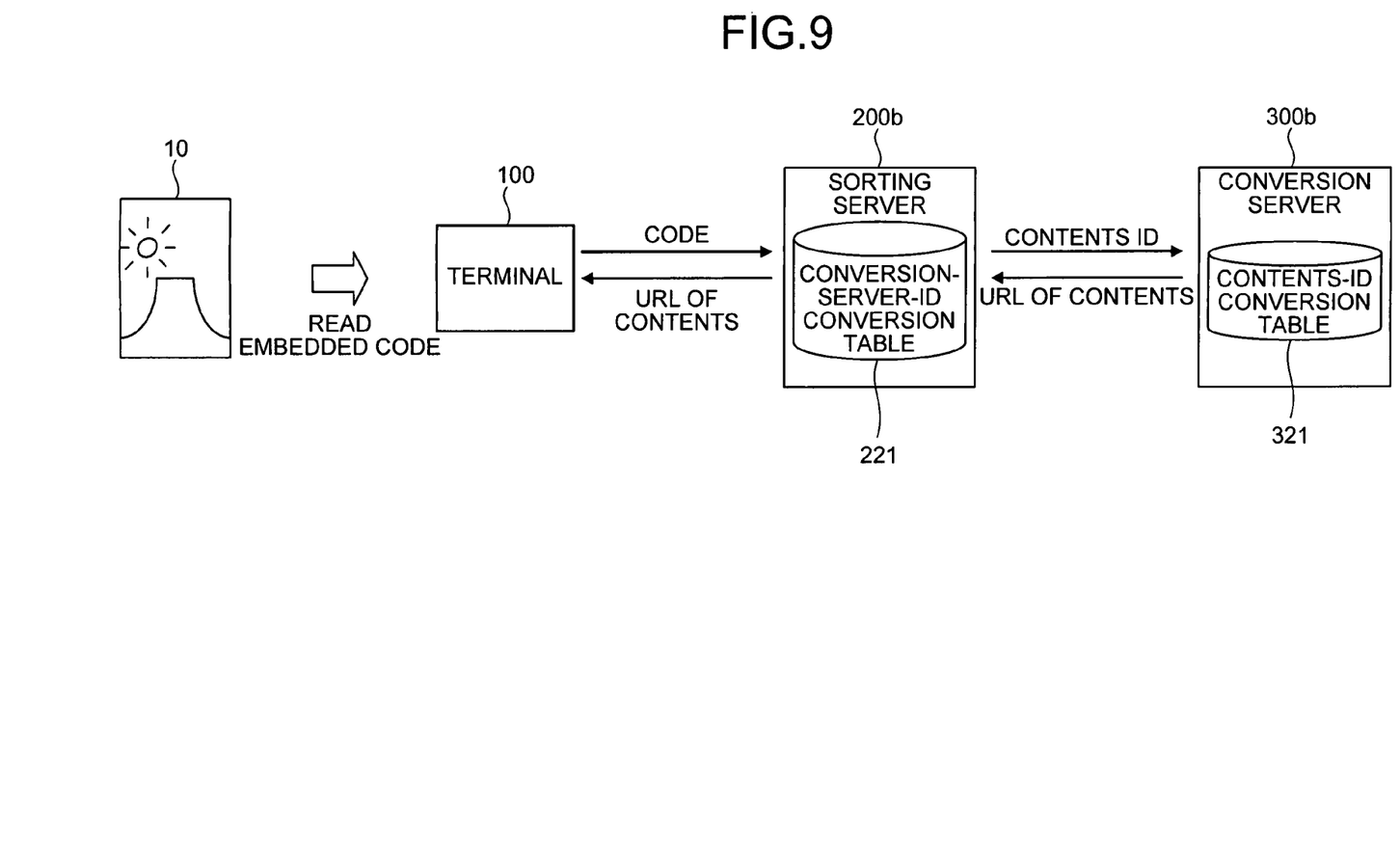
FIG. 9 is a schematic for illustrating a contents access method according to a second embodiment of the present invention.

FIG. 9 is a schematic for illustrating a contents access method according to the second embodiment. The contents access method according to the second embodiment is implemented with the image data 10, the terminal 100, a sorting server 200b and a conversion server 300b.

The image data 10 has a code embedded therein to access contents. The image data 10 may be loaded to the terminal 100 via a network, via a storage medium such as a DVD-ROM, or by picture taking of the picture-taking function of the terminal 100.

The terminal 100 is an information processor capable of displaying contents on the Internet, and may be for example a PC or a cellular phone terminal equipped with a photo-taking function. The terminal 100 is also capable of running a program to obtain the contents.

The program to obtain the contents reads the code embedded in the image data 10, transmits the code to the sorting server 200b known to the terminal 100, and receives the URL of the contents in response. The program then passes the URL over to a web browser, which then obtains the contents.

The program to obtain the contents is stored on the storing unit of the terminal 100 or on one of the servers such as the sorting server 200b, and is read and loaded on the memory of the terminal 100 as necessary and then executed by a processor.

The sorting server 200b is connected to the terminal 100 and conversion servers including the conversion server 300b via a network and is responsible for selecting the conversion server that stores correspondences of the codes and the contents.

Upon receiving the code for accessing the contents from the terminal 100, the sorting server 200b, decodes the code to obtain a conversion server ID and a contents ID. The conversion server ID is used by the sorting server 200b to identify a conversion server while the contents ID is used by the conversion server to identify the contents.

The sorting server 200b then searches the conversion-server-ID conversion table 221, to which correspondences of conversion server IDs and addresses of the conversion server are stored in advance, obtains the address of the conversion server that corresponds to the conversion server ID, and transmits the contents ID to the conversion server indicated by the obtained address of the conversion server. The sorting server 200b returns a URL of the contents returned from the conversion server to the terminal 100.

The conversion server 300b is connected to the sorting server 200b via the network and is responsible for converting the contents ID to the URL of the contents.

Upon receiving the contents ID from the sorting server 200b, the conversion server 300b, searches the contents-ID conversion table 321, to which the correspondences of the contents ID and URLs of the contents are stored in advance, obtains the URL that corresponds to the contents ID, and returns the obtained URL of the contents to the sorting server 200b.

In FIG. 9, only one conversion server is indicated, but there is no restriction on the number of the conversion servers. In principle, each of the contents providers provides at least one conversion server.

The contents access method according to the second embodiment is configured so that the sorting server 200b selects the conversion server using the code for accessing the contents, then accesses the selected conversion server, and returns the obtained address information of the contents to the terminal 100.

In this configuration, the sorting server 200b has a larger processing volume and hence larger workload than the sorting server 200a according to the first embodiment, but the conversion servers including the conversion server 300b are hidden from the terminals including the terminal 100, and are less prone to illegal accesses.

The conversion server 300b can also be configured so as to confirm that the contents ID is transmitted from the sorting server 200b. This configuration can reject illegal accesses not coming through the sorting server 200b.

The terminal 100 can also be configured so as to decode the code into the conversion server ID and the contents ID and transmits the conversion server ID and the contents ID to the sorting server 200b. In this configuration, the load on the sorting server 200b is lightened. On the other hand, if the sorting server 200b is responsible for decoding the code, the decoding process is centralized at one place, and it is therefore easier to make changes in the format of the code, etc.

The code can also be configured so as to be made up of only the contents ID and not a combination of the conversion server ID and the contents ID. In this configuration, the sorting server 200b selects the conversion server based on the range of the value or the format of the contents ID.

The sorting server 200b can also be configured so as to return to the terminal 100 not the URL of the contents but the contents themselves. In this configuration, either the sorting server 200b, or a conversion server, typically the conversion server 300b, needs to obtain the contents, and the workload on the server increases, but the server that provides the contents is hidden from the terminals including the terminal 100, and is less prone to illegal accesses.

Figure 10:
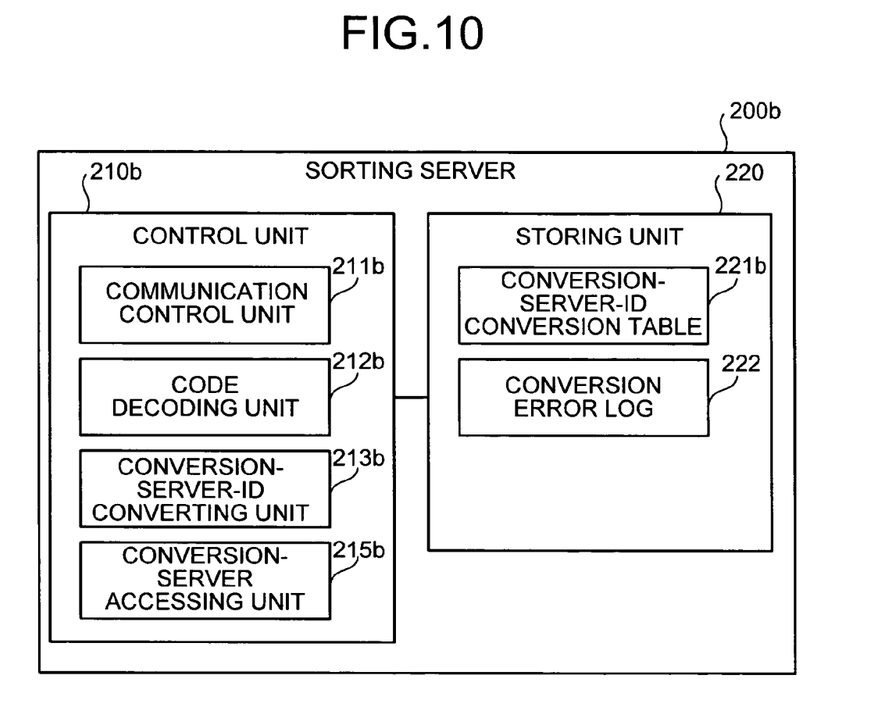
FIG. 10 is a block diagram of a sorting server according to the second embodiment.

FIG. 10 is a block diagram of the sorting server 200b according to the second embodiment. The sorting server 200b includes a control unit 210b and the storing unit 220.

The control unit 210b controls the entire sorting server 200b, and has a communication control unit 211b, a code decoding unit 212b, a conversion-server-ID converting unit 213b, and a conversion-server accessing unit 215b.

The communication control unit 211b controls transmission and receipt of various pieces of information through the network. Specifically the communication control unit 211b controls such processes as receiving the code for accessing contents transmitted from the terminal 100, etc., and transmitting the URL of the contents to the terminal that has transmitted the code.

The code decoding unit 212b and the conversion-server-ID converting unit 213b work similar to the code decoding unit 212a and the conversion-server-ID converting unit 213a, respectively, and their explanations are omitted.

The conversion-server accessing unit 215b transmits the contents ID obtained by the code decoding unit 212b to the server indicated by the address of the conversion server obtained by the conversion-server-ID converting unit 213b, and receives the URL of the contents in response.

The storing unit 220 is already explained in the first embodiment and its explanation is omitted.

Figure 11:
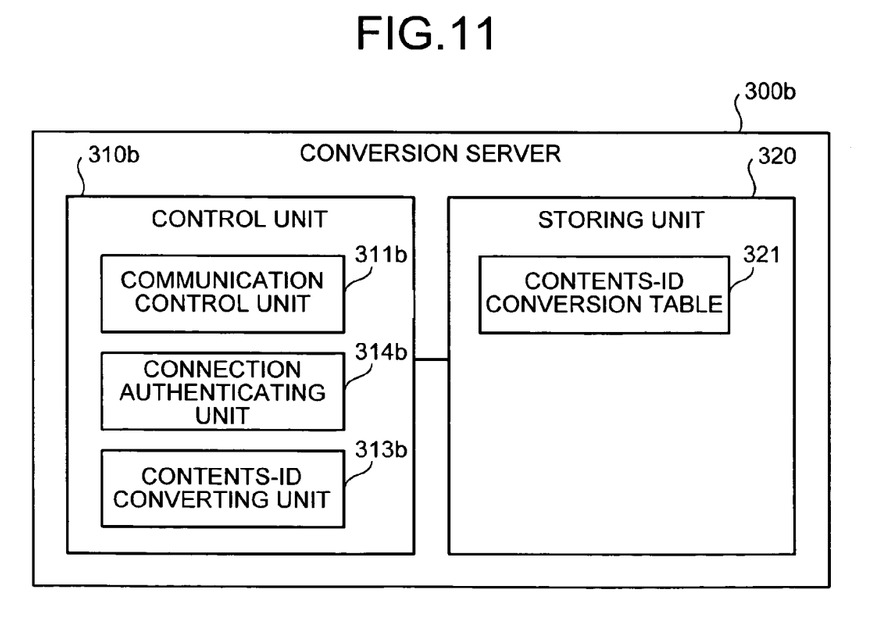
FIG. 11 is a block diagram of a conversion server according to the second embodiment.

FIG. 11 is a block diagram of the conversion server 300b according to the second embodiment. The conversion server 300b includes a control unit 310b and the storing unit 320.

The control unit 310b controls the entire conversion server 300b, and has a communication control unit 311b, a contents-ID converting unit 313b, and a connection authenticating unit 314b.

The communication control unit 311b controls transmission and receipt of various pieces of information through the network. Specifically the communication control unit 311b controls such processes as receiving the contents ID transmitted from the sorting server 200b and transmitting the URL of the contents to the sorting server 200b.

The contents-ID converting unit 313b works similar to the contents-ID converting unit 313a, and its explanation is omitted.

The connection authenticating unit 314b confirms if the contents ID is transmitted from the sorting server 200b using the IP address, etc. If the contents ID is not transmitted from the sorting server 200b, the communication control unit 211b does not transmit the URL of the contents to the system that has transmitted the contents ID.

The storing unit 320 is already explained in the first embodiment and its explanation is omitted.

Figure 12:
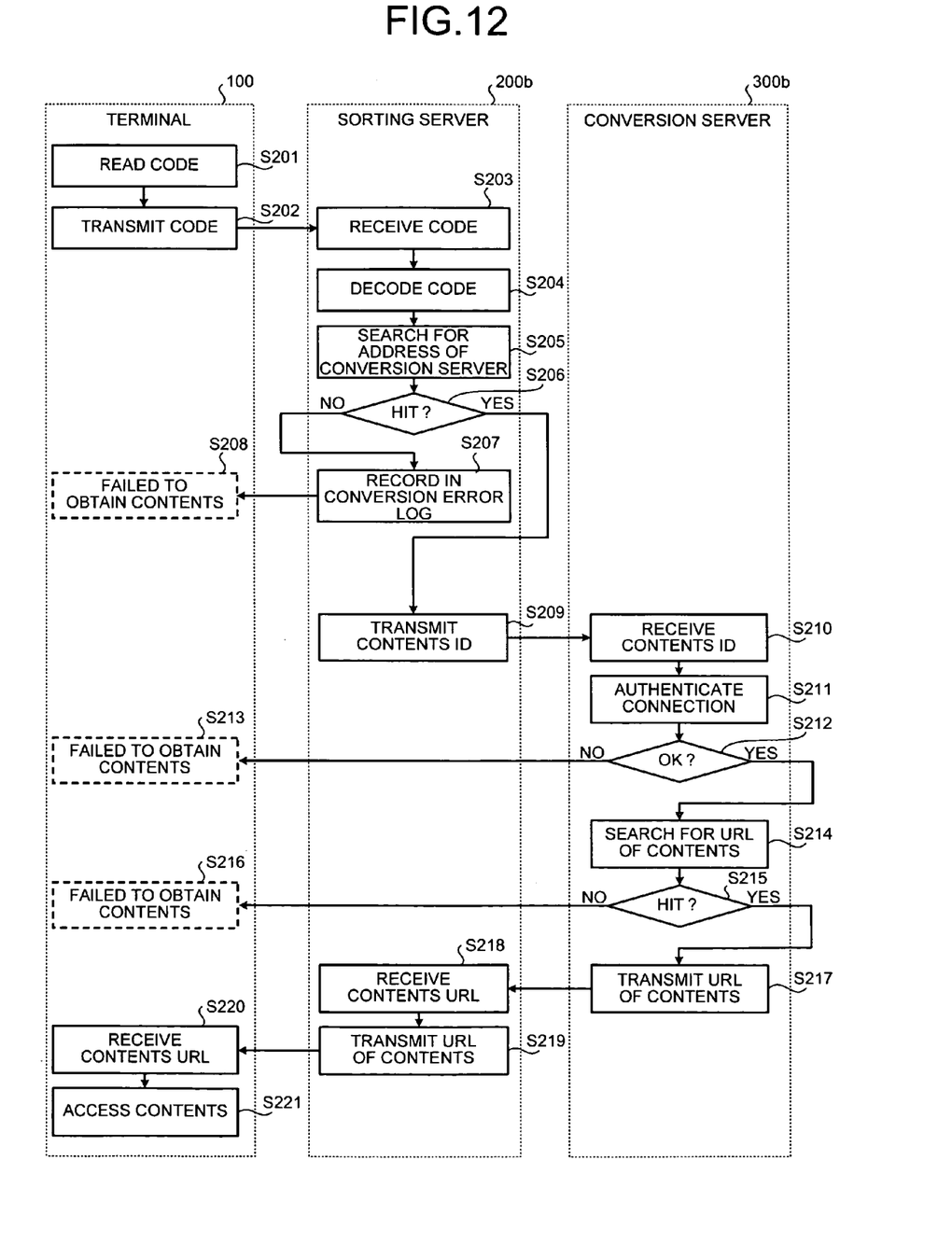
FIG. 12 is a flowchart of a processing process for a terminal, a sorting server, and a conversion server shown in FIG. 9.

FIG. 12 is a flowchart of a processing process for the terminal 100, the sorting server 200b, and the conversion server 300b shown in FIG. 9.

The terminal 100 first reads the code embedded in the image data 10 (step S201), and transmits the code to the sorting server 200b (step S202).

The sorting server 200b, upon receiving the code (step S203), decodes the code and obtains the conversion server ID and the contents ID (step S204). The sorting server then searches the conversion-server-ID conversion table 221 and obtains the address of the conversion server corresponding to the conversion server ID (step S205).

If the corresponding address of the conversion server is not found (NO at step S206), the sorting server 200b logs the failure to the conversion error log 222 (step S207). The sorting server 200b does not return the URL of the contents to the terminal 100, and the attempt of the terminal 100 to access the contents fails (step S208).

If the address of the conversion server that corresponds to the conversion server ID is found (YES at step S206), the sorting server 200b transmits the contents ID to the server (the conversion server 300b in this example) indicated by the address of the conversion server (step S209).

The conversion server 300b, upon receiving the contents ID (step S210), confirms if the contents ID is transmitted from the sorting server 200b (step S211).

If the conversion server 300b judges that the contents ID is not transmitted from the sorting server 200b (NO at step S212), no URLs of the contents are returned to the terminal 100, and the attempt of the terminal 100 to access the contents fails (step S213).

If the conversion server 300b judges that the contents ID is transmitted from the sorting server 200b (YES at step S212), the conversion server 300b searches the contents-ID conversion table 321 and obtains the URL of the contents that corresponds to the contents ID (step S214).

If the URL of the contents that corresponds to the contents ID is not found (NO at step S215), no URLs of the contents are returned to the terminal 100, and the attempt of the terminal 100 to access the contents fails (step S216).

If the URL of the contents that corresponds to the contents ID is found (YES at step S215), the conversion server 300b returns the URL of the contents to the sorting server 200b (step S217). Upon receiving the URL of the contents (step S218), the sorting server 200b returns the URL of the contents to the Terminal 100 (step S219). The terminal 100, upon receiving the URL of the contents (step S220), accesses the URL to obtain the contents (step S221).

According to the second embodiment, the sorting server selects the conversion server, sorts the code requesting the contents to the selected conversion server, and returns the information returned from the conversion server to the contents requesting source, and the access protocol to the conversion server can be hidden from the contents requesting source.

According to the present invention, a user is able to access contents without confusion by sending a code for accessing the contents to the sorting server, even in the presence of a plurality of contents providing systems that provide access to contents with a code.

Furthermore, according to the present invention, the load on the sorting server can be lightened.

Moreover, according to the present invention, the access protocol to the selected section for receiving the sorted code can be hidden from the contents requesting source.

Furthermore, according to the present invention, all the details of the protocol to obtain the contents can be hidden from the contents requesting source.

Moreover, according to the present invention, an access to a contents providing system with an illegal code can be prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of providing an access to contents on a network, the method comprising:
   sorting, at a sorting server, a code for accessing the contents, wherein the code is received from a contents requesting source;
   determining a first ID and a second ID from the sorting of the code;
   selecting, based on the first ID, one of a plurality of destinations for transmitting the second ID;
   converting the second ID into information indicating a storage place of the contents;
   returning the information indicating the storage place of the contents to the contents requesting source;
   transmitting the second ID to a conversion server; and
   confirming, at the conversion server, that the second ID is transmitted from the sorting server.

2. The method according to claim 1, further comprising:
   the contents requesting source reading the code corresponding to the contents from an image data in which the code is embedded; and
   the contents requesting source requesting the contents corresponding to the code to the sorting server.

3. The method according to claim 1, further comprising:
   decoding the code from the contents requesting source to obtain the first ID and the second ID.

4. The method according to claim 1, wherein
   the sorting sorts a contents ID obtained from the code as the second ID for accessing the contents to the conversion server selected based on a conversion server ID obtained from the code as the first ID.

5. A sorting apparatus connected to a plurality of conversion servers that store information indicating storage places of the contents via a network, the sorting apparatus comprising:
   a sorting unit to sort a code that is received from a contents requesting source and determine a first ID and a second ID from the sorted code, wherein the code is for accessing the contents, and
   wherein one of the conversion servers is selected as a sorting destination based on the first ID, the second ID is transmitted to the sorting destination and the confirmed by the sorting destination to indicate the second ID was transmitted from the sorting apparatus; and
   a receiving unit to receive information returned from the sorting destination in response to the second ID.

6. The sorting apparatus according to claim 5, further comprising:
   a responding unit to return information received by the receiving unit to the contents requesting source as information indicating the storage place of the contents.

7. The sorting apparatus according to claim 6, wherein
   the responding unit includes authentication information for certifying that the sorting apparatus selected the sorting destination in a response to the contents requesting source.

8. The sorting apparatus according to claim 5, further comprising:
   an obtaining unit to obtain contents based on information received by the receiving unit; and
   a responding unit to return the contents obtained by the obtaining unit to the contents requesting source.

9. The sorting apparatus according to claim 5, further comprising:
   a control unit to determine an authenticity of the second ID and control the sorting unit based on a result of determination of the authenticity.

10. A computer-readable recording medium that stores a sorting program that is executed on a computer connected to a plurality of conversion servers that stores information indicating storage places of the contents via a network, wherein the sorting program causes the computer to execute:
    sorting a code that is received from a contents requesting source, the code is for accessing the contents;
    determining a first ID and a second ID from the sorting of the code;

selecting one of the conversion servers as a sorting destination based on the first ID;

transmitting the second ID to the sorting destination, the transmitted second ID being confirmed by the sorting destination to confirm the second ID was transmitted from the computer; and receiving information returned from the sorting destination in response to the second ID.

11. The computer-readable recording medium according to claim 10, wherein the sorting program further causes the computer to execute:

returning information received by the receiving unit to the contents requesting source as information indicating the storage place of the contents.

12. The computer-readable recording medium according to claim 11, wherein the returned information includes authentication information for certifying that the sorting program selected the sorting destination in a response to the contents requesting source.

13. The computer-readable recording medium according to claim 10, wherein the sorting program further causes the computer to execute:

obtaining contents based on information received at the receiving; and returning the contents obtained at the obtaining to the contents requesting source.

14. The computer-readable recording medium according to claim 10, wherein the sorting program further causes the computer to execute:

determining an authenticity of the second ID; and controlling the sorting based on a result of determination of the authenticity.

* * * * *